(12) United States Patent
Bass

(10) Patent No.: US 6,951,273 B2
(45) Date of Patent: Oct. 4, 2005

(54) HANGER BEARING FOR AUGER TYPE POULTRY CHILLER WITH CONE DEFLECTOR

(75) Inventor: Gregory T. Bass, Clayton, NC (US)

(73) Assignee: Morris & Associates, Inc., Garner, NC (US)

(*) Notice: Subject to any disclaimer, the term of this patent is extended or adjusted under 35 U.S.C. 154(b) by 133 days.

(21) Appl. No.: 10/712,846

(22) Filed: Nov. 13, 2003

(65) Prior Publication Data

US 2004/0188226 A1 Sep. 30, 2004

Related U.S. Application Data

(63) Continuation-in-part of application No. 10/336,273, filed on Jan. 3, 2003, now Pat. No. 6,722,490.

(51) Int. Cl.[7] ............................................. B65G 33/00
(52) U.S. Cl. ........................................................ 198/657
(58) Field of Search ................. 198/657, 672, 198/673; 384/434, 252, 260

(56) References Cited

U.S. PATENT DOCUMENTS

| | | | | |
|---|---|---|---|---|
| 2,279,201 A | * | 4/1942 | Kozak et al. | 198/666 |
| 2,973,855 A | * | 3/1961 | Pro | 198/608 |
| 3,333,679 A | * | 8/1967 | Zimmermann et al. | 198/659 |
| 3,351,395 A | * | 11/1967 | Stone | 384/428 |
| 3,812,607 A | * | 5/1974 | Fenske | 37/420 |
| 4,220,242 A | * | 9/1980 | Forsberg | 198/666 |
| 4,384,643 A | * | 5/1983 | Cone | 198/672 |
| 4,512,687 A | * | 4/1985 | Enns | 406/41 |
| 4,815,585 A | * | 3/1989 | May | 198/672 |
| 5,370,464 A | * | 12/1994 | Blaha | 384/252 |
| 5,772,968 A | * | 6/1998 | Wolfe | 422/189 |
| 5,941,810 A | * | 8/1999 | Gay | 494/53 |
| 6,341,481 B1 | * | 1/2002 | van der Merwe | 56/95 |

* cited by examiner

Primary Examiner—Richard Ridley
(74) Attorney, Agent, or Firm—Thomas, Kayden, Horstemeyer & Risley, LLP

(57) ABSTRACT

A poultry chiller 100 has a hanger 140 suspended from the upper portion of the tank 102 that supports the bearing block 160 of the auger shaft 112 between the auger blades. A conical bird deflector 175 is mounted on the auger shaft and radially deflects the birds away from the bearing block as the birds are urged across the bearing block.

24 Claims, 8 Drawing Sheets

HANGER BEARING FOR AUGER TYPE POULTRY CHILLER WITH CONE DEFLECTOR

CROSS REFERENCE

This is a continuation-in-part of U.S. patent application Ser. No. 10/336,273, filed Jan. 3, 2003, now U.S. Pat. No. 6,722,490.

TECHNICAL FIELD

The present invention generally relates to poultry chillers for reducing the temperature of whole birds after the birds have been eviscerated on a poultry processing line. More particularly, the invention relates to a hanger bearing assembly configured to support an auger within the poultry chiller.

BACKGROUND OF THE INVENTION

It is desirable to reduce the temperature of chickens and other type poultry after the birds have been processed, or de-feathered, eviscerated, and are otherwise oven-ready and before the birds are packaged for delivery to the retail customer. A conventional poultry chiller 10, as shown in FIG. 1, is the "auger type" poultry chiller 10 which includes a trough-shaped, half-round tank 12 filled with ice water in which the auger 20 provides positive movement of the birds through the tank 12. The cooling effect for the water and the bird was originally provided by crushed ice added to the water. The later prior art designs included a counter-flow recirculation of the chilled water through the tank 12, with water being chilled by a refrigerated heat exchanger 40 instead of ice, as shown in FIG. 2. The water is introduced at one end of the tank 12, the outlet end 16, and flows progressively to the other end, the inlet end 14, where it is recirculated. In the meantime, the birds are continually delivered to the tank 12 and moved under the influence of the auger 20 in the counter-flow direction, and are lifted from the outlet end 16 of the tank 12 for further processing. A prior art poultry chiller of this general type is disclosed in U.S. Pat. No. 5,868,000, and the heat exchanger for the water refrigeration system suitable for this purpose is shown in U.S. Pat. No. 5,509,470.

As noted, chilled water is added to the tank 12 at the outlet end 16 of the tank 12, where the birds have been chilled and are being lifted out of the tank 12. The water flows against the birds in the opposite direction of movement of the birds, thereby assuring that the birds are always flowing into the cleanest water and that there is always a temperature drop between the temperature of each bird and the temperature of the water about each bird. Typical trough-shaped tanks 12 of the chillers 10 can be 5 to 12 feet in diameter and 15 to 150 feet in length. Frequently, one or more hanger bearings 30 are provided to assist in properly supporting the auger 20. Typically, the maximum space between hanger bearings 30 is approximately 35 feet.

As best seen in FIG. 3, the auger 20 is formed in segments and the hanger bearings 30 are located between the auger segments. A typical prior art hanger bearing 30 is supported by a horizontally extending upper structural support element 32 that is mounted at its ends to the sides of the trough and includes a downwardly depending central vertical support 33 and at its lower end an upper plate 31. A lower plate 34 is mounted to the upper plate and together they form an internal bearing surface (not shown). Typically, the segments of the auger 20 are connected by a horizontal shaft (not shown) which is received within the bearing surface, the bearing surface being sandwiched between the upper plate 31 and the lower plate 34, thereby transferring the weight of the auger 20 to the horizontally extending upper structural support element 32. Typically, the diameter of the horizontal shaft is smaller than the diameter of the auger shaft 22, thereby requiring the bearing surface of the lower plate 34 and the upper plate 31 and the vertical segment 33 of the hanger bearing 30 to be at least partially disposed between segments of the auger shaft 22. Therefore, the distance separating segments of the auger shaft 22 is limited by the dimensions of these elements. In turn, the distance separating segments of the helical flight structure 21 of the auger 20 is also limited by the dimensions of these elements. As well, because the upper structural support elements 32 typically used to provide support to the auger 20 extend across the tank 12 within the periphery of the helical flight structure 21, the structural elements 32 similarly dictate the separation required between independent segments of the helical flight structure 21. Separation between segments of the helical flight structure 21 are frequently on the order of 10 inches or greater.

One of the problems of existing hanger bearings 30 is that the interruption of the helical blade structure at the intermediate bearing location impedes the forward movement of birds through the poultry chiller. Also, it is possible that some birds will move backwards in the chiller due to the counter flow of water once a bird passes by the trailing edge of a segment of the helical flight structure. Those birds that move backwards about a segment of the helical flight structure require more time than is intended to move from the inlet end to the outlet end of the trough because they traverse the same segment of the chiller more than once. The reverse movement of these birds tends to create, or increase, the size of product surges traveling through the poultry chiller. The surges result in uneven unloading of the birds at the outlet end of the chiller, causing personnel handling the birds at the outlet end of the chiller to either speed up or slow down depending upon the output of birds from the chiller. In some cases, surges can require the addition of extra handling personnel. In those instances where personnel are not available, it is not uncommon for the birds to back up in the chiller discharge chute, causing birds to spill over the sides of the chute and handling tables positioned at the outlet end of the chiller. It is possible to collect these birds prior to spill over and place them in suitable vats and storage containers. However, for those plants that do not have additional handling personnel, or that don't respond quickly enough to the surges, the birds will frequently fall to the plant floor, leading to lost product and unsanitary conditions.

Another problem with typical hanger bearings is that the relatively large spacing required between independent segments of the helical flight structure (approximately 10 inches and up) allows birds to remain in the poultry chiller after processing is complete. These birds must be removed by handling personnel prior to cleaning the poultry chiller. Removal of the stranded birds increases the time required to clean the poultry chiller, thereby increasing the down time for cleaning the chiller. As such, fewer birds can be processed through the chiller for each production run. In addition to increased time and expense associated with the clean-up process, expense is incurred due to loss of product at the hanger bearing. Longer chillers require more hanger bearings to support the auger, thereby resulting in more frequent surging and increase product loss.

From the foregoing, it can be appreciated that it would be desirable to have a hanger bearing assembly for use with a poultry chiller that permits minimum horizontal displacement between segments of the helical flight structure. As well, it would be desirable if the hanger bearing assembly permitted spacing between the segments of the helical flight structure such that birds were prevented from moving through the chiller counter to their intended direction. Thus, a heretofore unaddressed need exists in the industry to address the aforementioned deficiencies and inadequacies.

SUMMARY OF THE INVENTION

Briefly described, this invention involves a poultry chiller that includes a hanger bearing assembly for use in supporting a segmented auger of an auger type poultry chiller. The novel hanger bearing assembly allows smaller gaps to be formed between the segments of the auger. The smaller gap between the auger segments reduces the tendency of birds moving from the first auger blade to the second auger blade to be deflected rearwardly in a direction counter to that intended.

Another feature is a bird deflector that is positioned at the end of a first auger blade that radially urges the birds about the hanger bearing assembly so as to avoid the birds encountering the bearing assembly and avoid the birds being hindered by the bearing assembly in their travels along the tank of the chiller.

An embodiment of the hanger bearing assembly for use in an auger type poultry chiller has an auger with a first flight and a second flight both secured about an auger shaft, the first auger flight having a first flange plate and the second flight having a second flange plate. A bearing disk is secured between the first flange plate and the second flange plate. A bearing block is disposed about the bearing disk, a lower bearing plate is secured to the poultry chiller, and the lower bearing plate has a support segment configured to receive the bearing block. An upper bearing plate is configured to receive the bearing block. The upper bearing plate is secured to the lower bearing plate, thereby maintaining the bearing block adjacent the bearing disk and securing the auger to the lower bearing plate.

An embodiment of the bird deflector is a conically shaped bird deflector positioned co-axially on the auger shaft with its smaller end portion facing the on-coming birds and the bird entrance end of the tank and its larger end portion positioned closely adjacent the auger bearing assembly to gently guide the girds about the bearing assembly.

Other systems, methods, features, and advantages of the present hanger bearing assembly will be or become apparent to one with skill in the art upon examination of the following drawings and detailed description. It is intended that all such additional systems, methods, features, and advantages be included within this description, be within the scope of the hanger bearing assembly, and be protected by the accompanying claims.

BRIEF DESCRIPTION OF THE DRAWINGS

The hanger bearing assembly can be better understood with reference to the following drawings. The components in the drawings are not necessarily to scale, emphasis instead being placed upon clearly illustrating the principles of the hanger bearing assembly. Moreover, in the drawings, like reference numerals designate corresponding parts throughout the several views.

Figure 1:
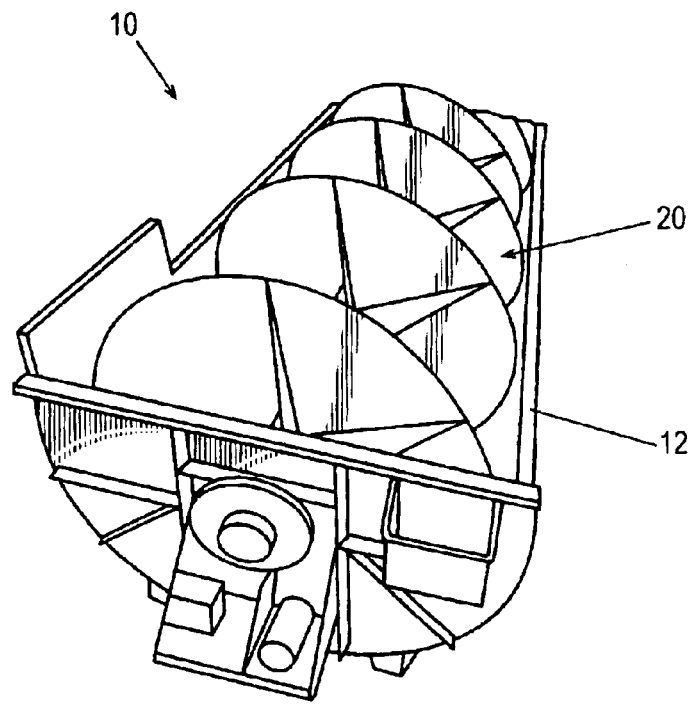
FIG. 1 is a perspective view of a prior art poultry chiller.
Figure 2:
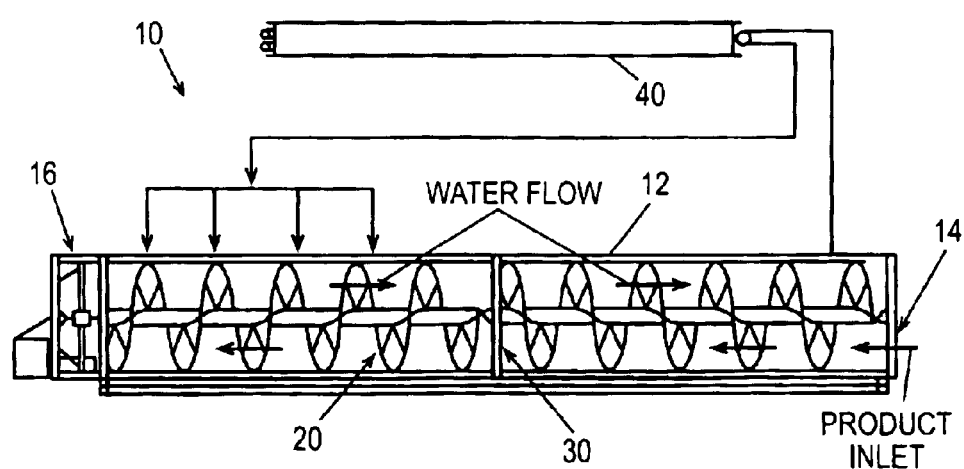
FIG. 2 is a side elevation cut-away view of a prior art poultry chiller.
Figure 3:
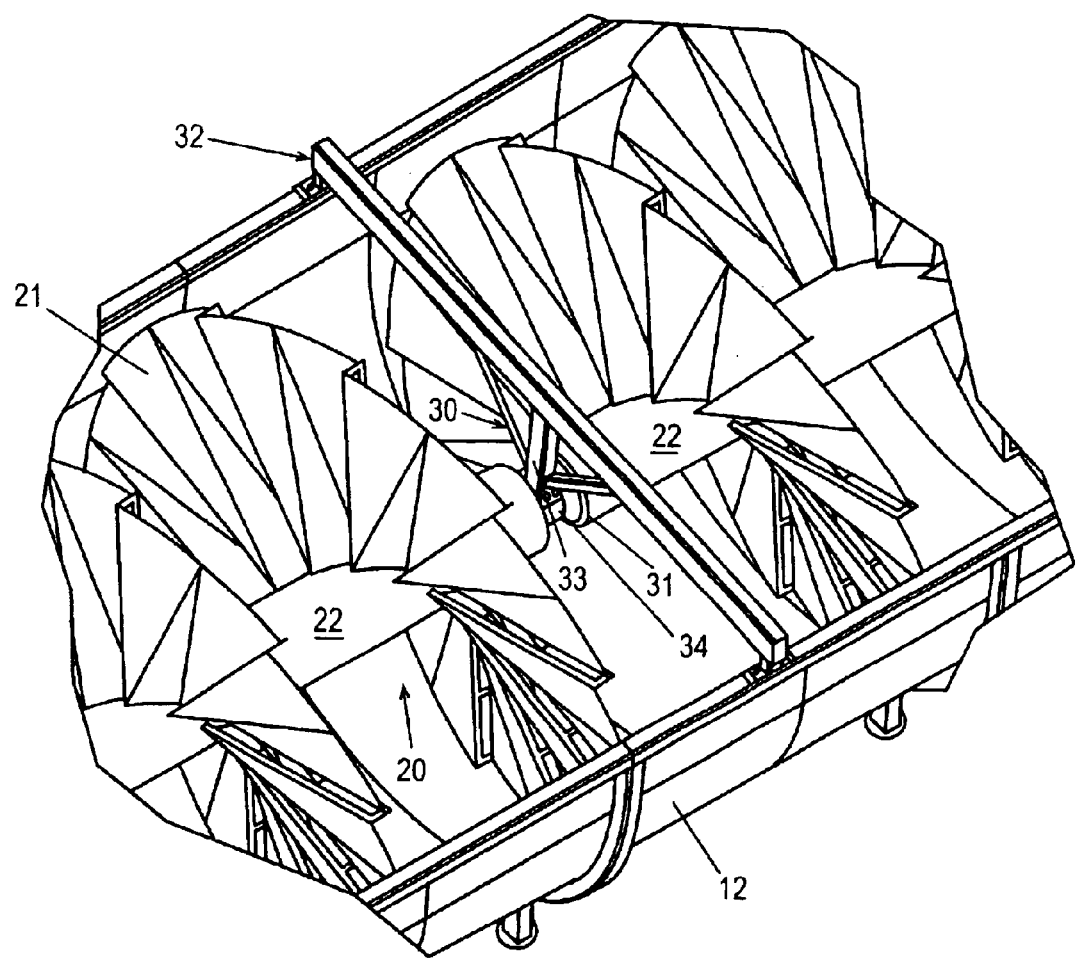
FIG. 3 is a top perspective view of a segment of the prior art poultry chiller shown in FIG. 2.

Reference will now be made in detail to the description of the hanger bearing assembly as illustrated in the drawings. While the hanger bearing assembly will be described in connection with these drawings, there is no intent to limit the hanger bearing assembly to the embodiment or embodiments disclosed therein. On the contrary, the intent is to cover all alternatives, modifications, and equivalents included within the spirit and scope of the hanger bearing assembly as defined by the appended claims.

DETAILED DESCRIPTION OF THE PREFERRED EMBODIMENT

Figure 4A:
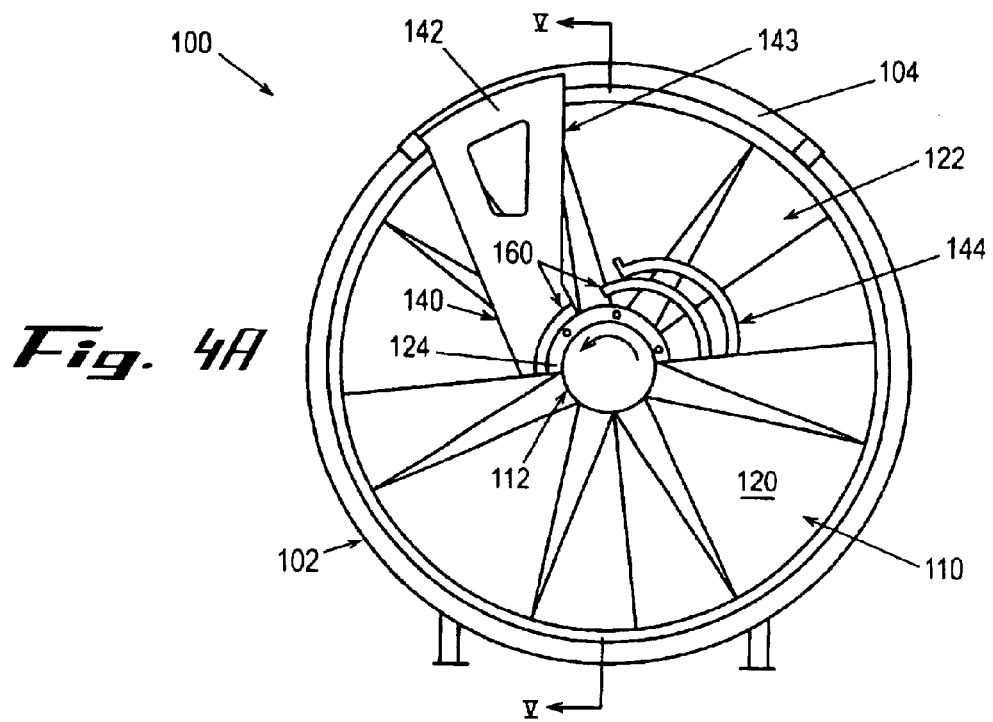
FIG. 4A is a cross-sectional view of a poultry chiller including an embodiment of a hanger bearing assembly according to the present invention, as viewed from the inlet end of the poultry chiller.

Referring now in more detail to the drawings, in which like numerals indicate like parts throughout the several views, FIG. 4A illustrates a cross-sectional view of the poultry chiller 100 as viewed from the inlet end. The poultry chiller 100 includes a semi-cylindrical water reservoir, or tank 102, a support member 104 connected to the tank 102, and an auger 110 supported at opposing ends by the tank 102.

Figure 4B:
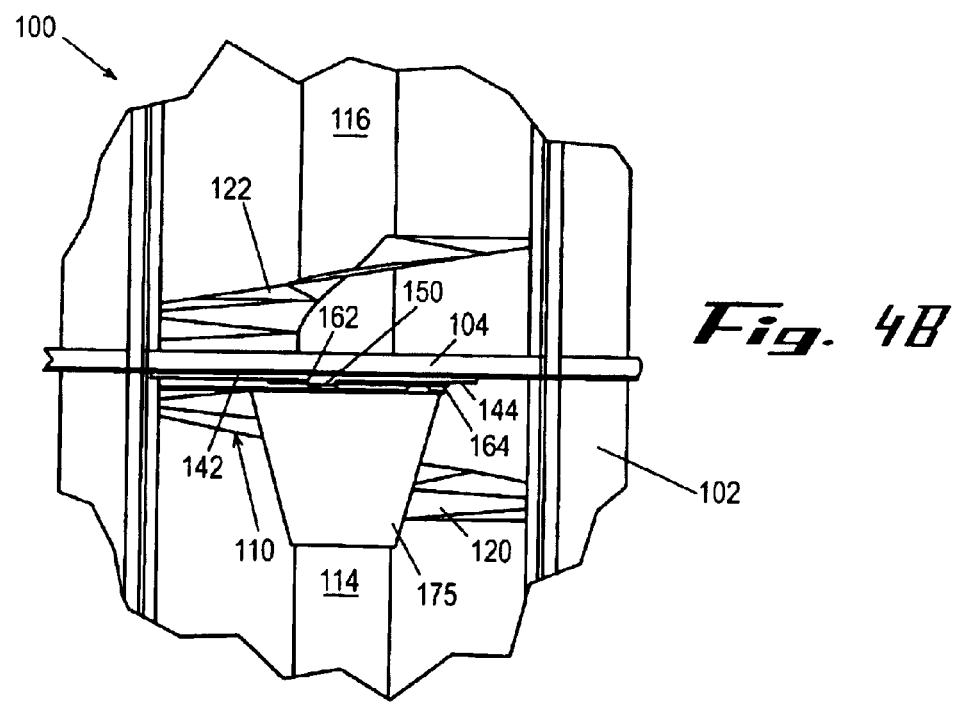
FIG. 4B is a partial top view of a segment of the poultry chiller as shown in FIG. 4A.
Figure 4C:
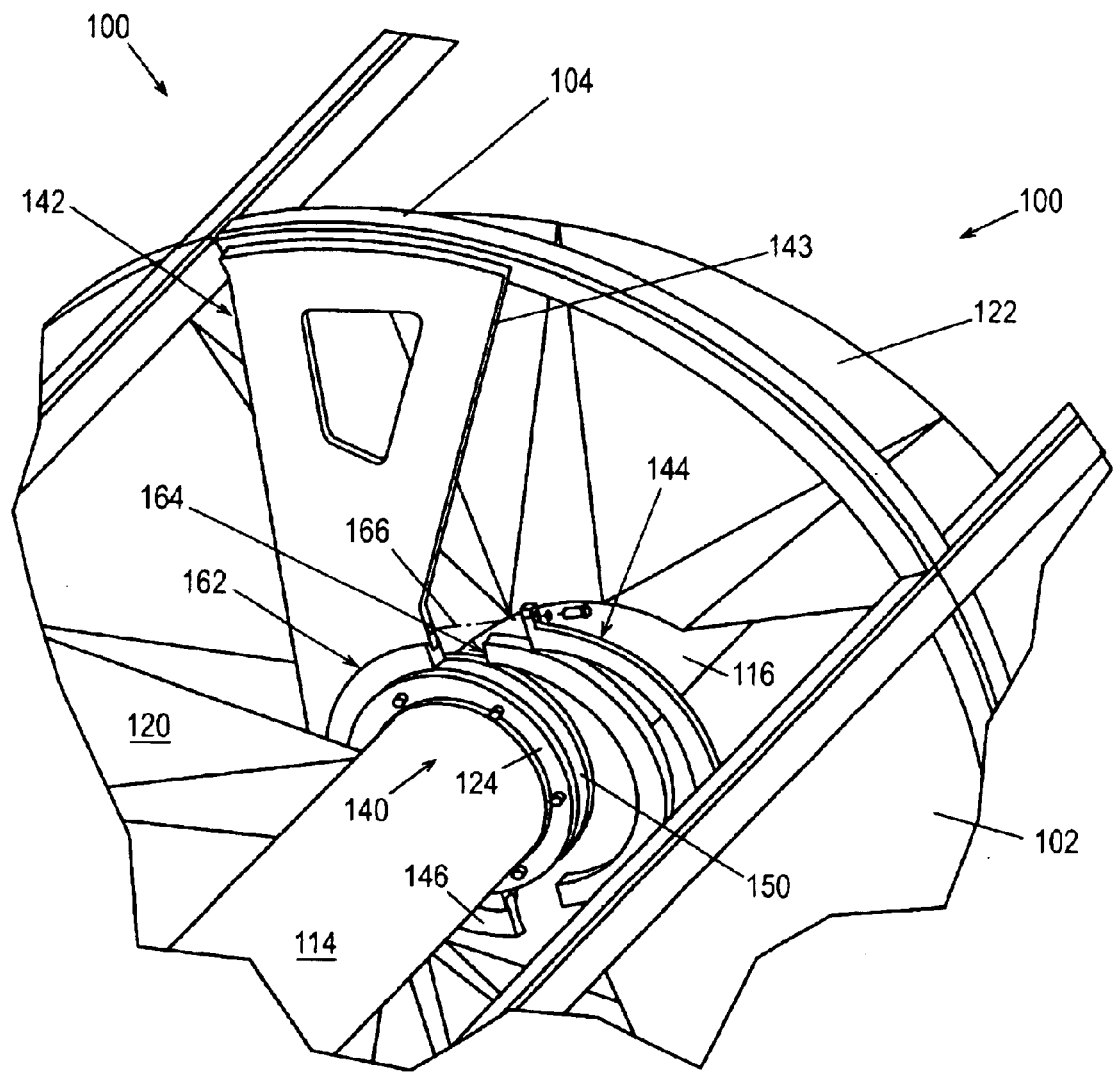
FIG. 4C is a partial perspective top view of the poultry chiller as shown in FIG. 4A.

The auger 110 is positioned longitudinally in the tank 102. An electric motor or other conventional power means (not shown) is provided to rotate the auger 110. The auger 110 includes an auger shaft 112 and a helical blade structure formed around the shaft 112. As shown in FIG. 4B, the auger shaft 112 includes at least a first auger shaft segment 114 and a second auger shaft segment 116. The helical blade structure includes a first flight segment 120 formed around the first auger shaft segment 114 and a second flight segment 122 formed around the second auger shaft segment 116. Providing independent segments of the auger 110 in this fashion is necessitated by the need to provide support for the auger 110 at various points along its length. Support is provided to the auger 110 at the central locations by hanger bearing assemblies 140 constructed in accordance with the present invention, a preferred embodiment of which is shown in FIGS. 4A–4C. A preferred embodiment of a hanger bearing assembly 140, according to the present invention, includes a lower bearing plate 142, an upper bearing plate 144, a bearing disk 150, and an O-shaped bearing block 160.

Figure 5A:
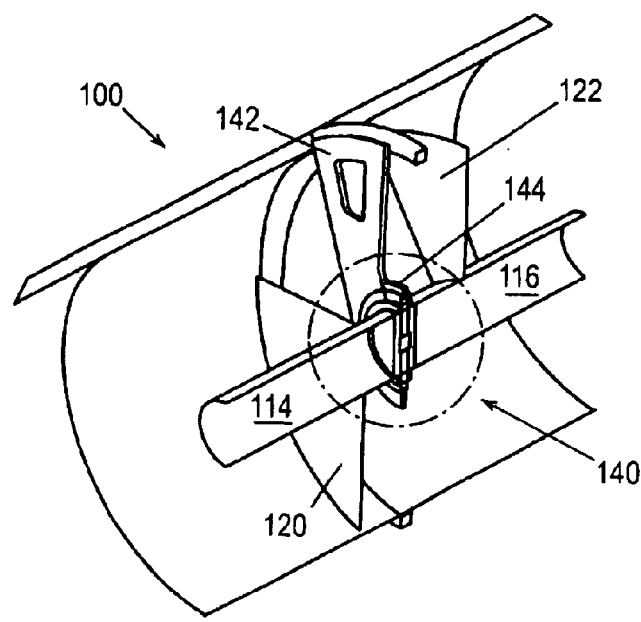
FIG. 5A is a partial cross-sectional perspective view of the poultry chiller as shown in FIG. 4A, taken along line V—V.
Figure 5B:
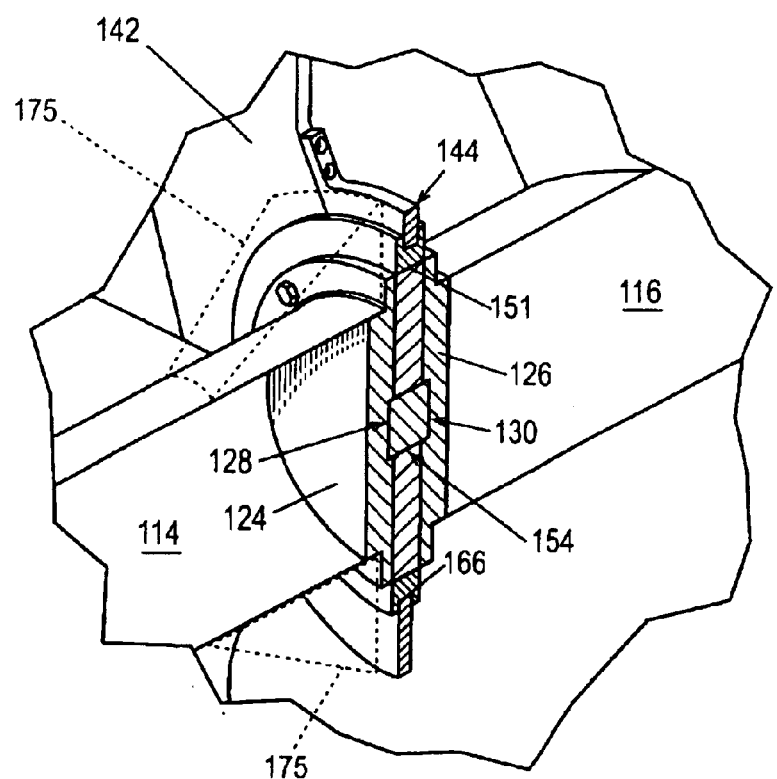
FIG. 5B is a perspective cross sectional view of the circled segment of the poultry chiller shown in FIG. 5A, shown in greater detail.

Referring now to FIGS. 5A and 5B, the first auger shaft segment 114 and the second auger shaft segment 116 are provided with a first flange plate 124 and a second flange plate 126, respectively, as a means for connecting the first and second auger shaft segments 114, 116. In the preferred embodiment shown, the bearing disk 150 is a circular plate-like structure having a bearing surface 151 formed around its outer periphery. The bearing disk 150 is coupled between the first flange plate 124 and the second flange plate 126 using threaded fasteners, thereby securing the first auger shaft segment 114 to the second auger shaft segment 116. Preferably, the bearing disk 150 includes a coupling aperture 152 that is arranged and configured to axially align with a first coupling recess 128 and a second coupling recess 130 disposed in the first flange plate 124 and the second flange plate 126, respectively. Proper axial alignment of the first auger shaft segment 114 and the second auger shaft segment 116 is accomplished by disposing a coupling shaft 154 in the coupling aperture 152 as well as the first and second coupling recesses 128, 130. Note, the coupling aperture 152, coupling shaft 154, and the first and second coupling recesses 128 and 130, merely provide assistance in adequately aligning the first auger shaft segment 114 with the second auger shaft segment 116, and are therefore not required elements for all embodiments of the present invention.

Referring back to FIG. 4C, the lower bearing plate 142 extends radially outwardly from the auger shaft 112 toward the support member 104 that is connected to the tank 102. The lower bearing plate 142 is secured to the support member by any adequate means, such as welding, threaded fasteners, etc. Note, the support member 104 is arranged and configured so as not to be disposed between the first flight segment 120 and second flight segment 122, as best shown in FIG. 4A. As such, the support member 104 does not factor into the required lateral spacing between the first flight segment 120 and the second flight segment 122. The lower bearing plate 142 includes a support segment 146 configured to receive a first half 162 of the bearing block 160. Preferably, the support segment 146 extends beyond a vertical center line of the auger shaft 112 such that the weight of the auger 110 can be supported by the lower bearing plate 142 without the use of the upper bearing plate 144. As such, the support segment 146 assists personnel during installation of the auger 110 into the poultry chiller 100. However, embodiments of the hanger bearing assembly 140 are envisioned wherein the support segment 146 does not extend beyond the vertical center line of the auger shaft 112. The second half 164 of the bearing block 160 is secured in the lower bearing plate 144 adjacent to the bearing surface 151 of the bearing disk 150 with the upper bearing plate 144. As shown, the bearing block includes a U-shaped channel 166 to assist in positioning the bearing block 160 on the lower and upper bearing plates 142, 144. Preferably, the upper bearing plate 144 is secured to the lower bearing plate 142 with threaded fasteners.

Preferred embodiments of the present hanger bearing assembly 140 can include bearing disks 150 having widths of approximately two inches and lower bearing plates 142 and upper bearing plates 144 having widths of approximately one inch. Although these dimensions have been determined to provide an adequate area of contact between the bearing disk 150 and the bearing block 160, embodiments are envisioned wherein these dimensions vary significantly. For example, these dimensions are influenced by the weight of the auger 110 that each bearing assembly 140 is required to support. Also note, as the diameter of the bearing disk 150 increases, a constant amount of contact area can be maintained although the width of the bearing disk 150 is reduced in the longitudinal direction. Reduced bearing disk 150 width translates into reduced longitudinal spacing between the first and second flight segments 120, 122.

Figure 6A:
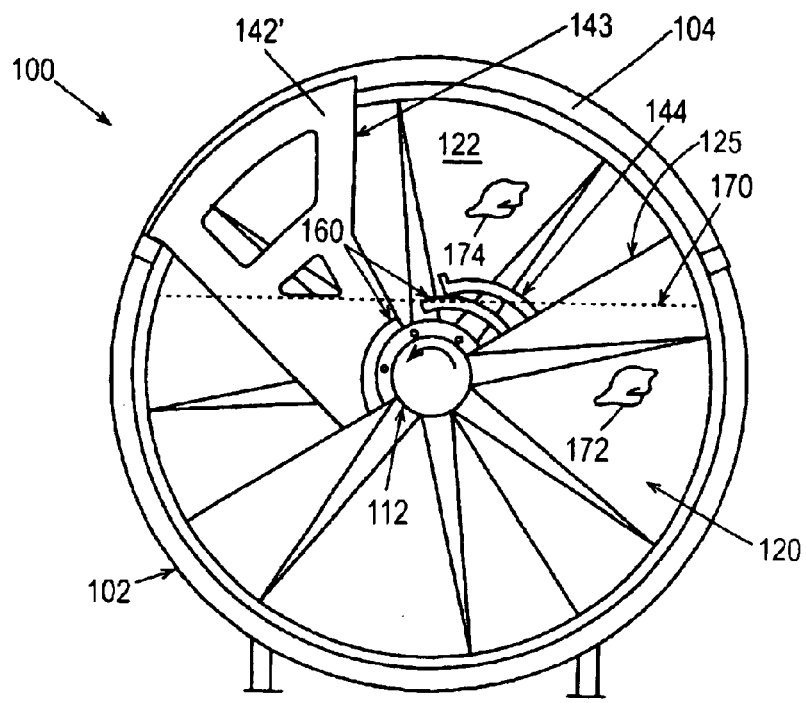
FIG. 6A is a cross-sectional view of a poultry chiller including an embodiment of a hanger bearing assembly according to the present invention, as viewed from the outlet end of the poultry chiller.
Figure 6B:
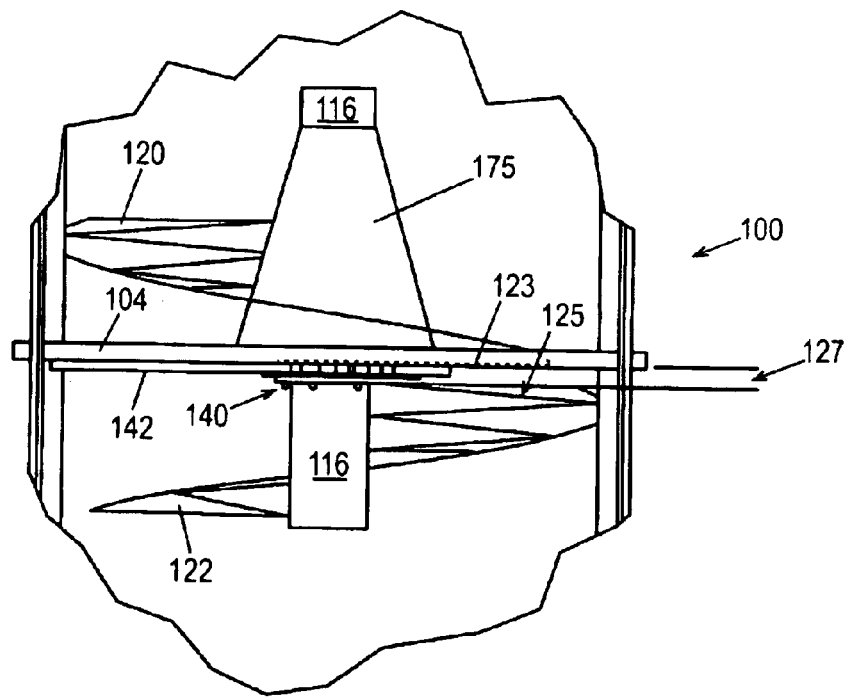
FIG. 6B is a partial top view of a segment of the poultry chiller as shown in FIG. 6A.
Figure 7:
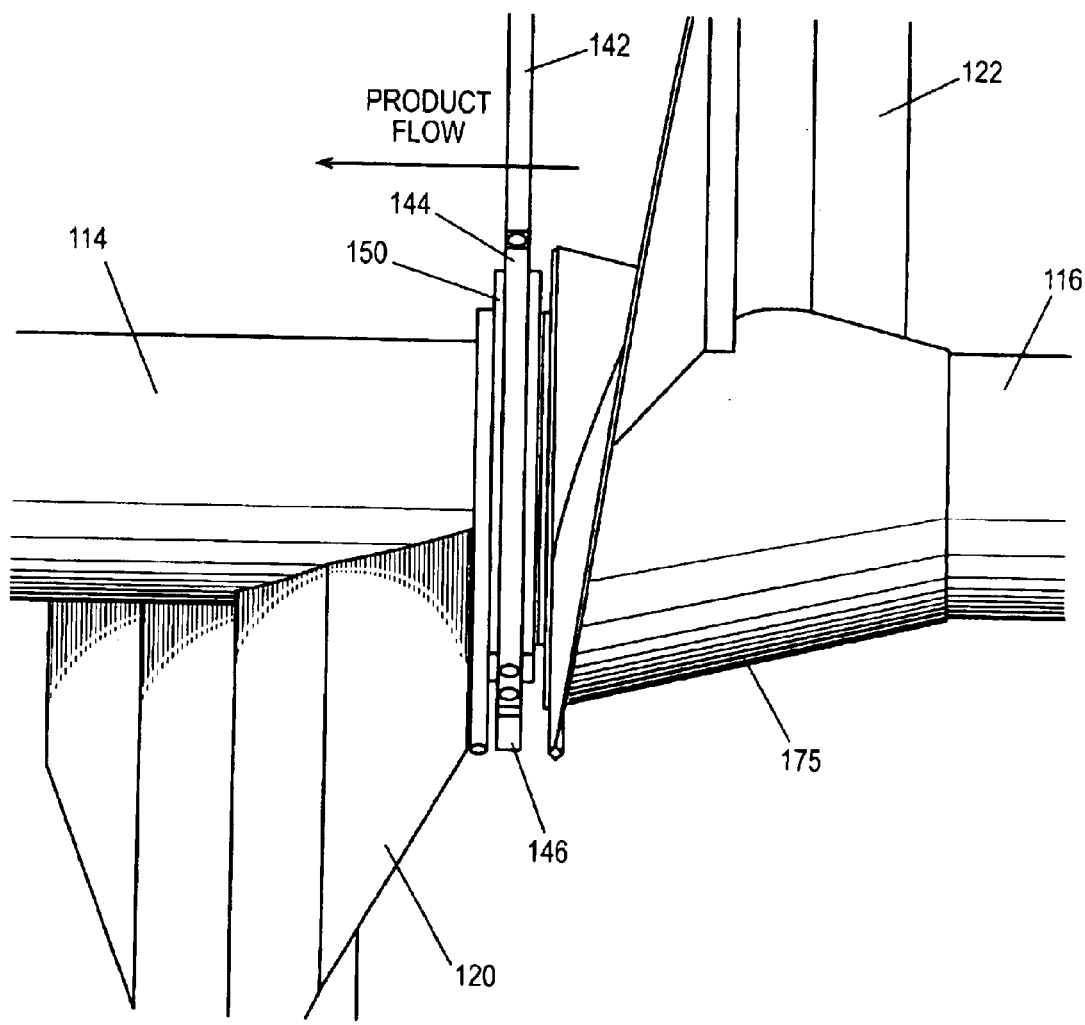
FIG. 7 is a side view of the bearing assembly and the conical bird deflector.
Figure 8:
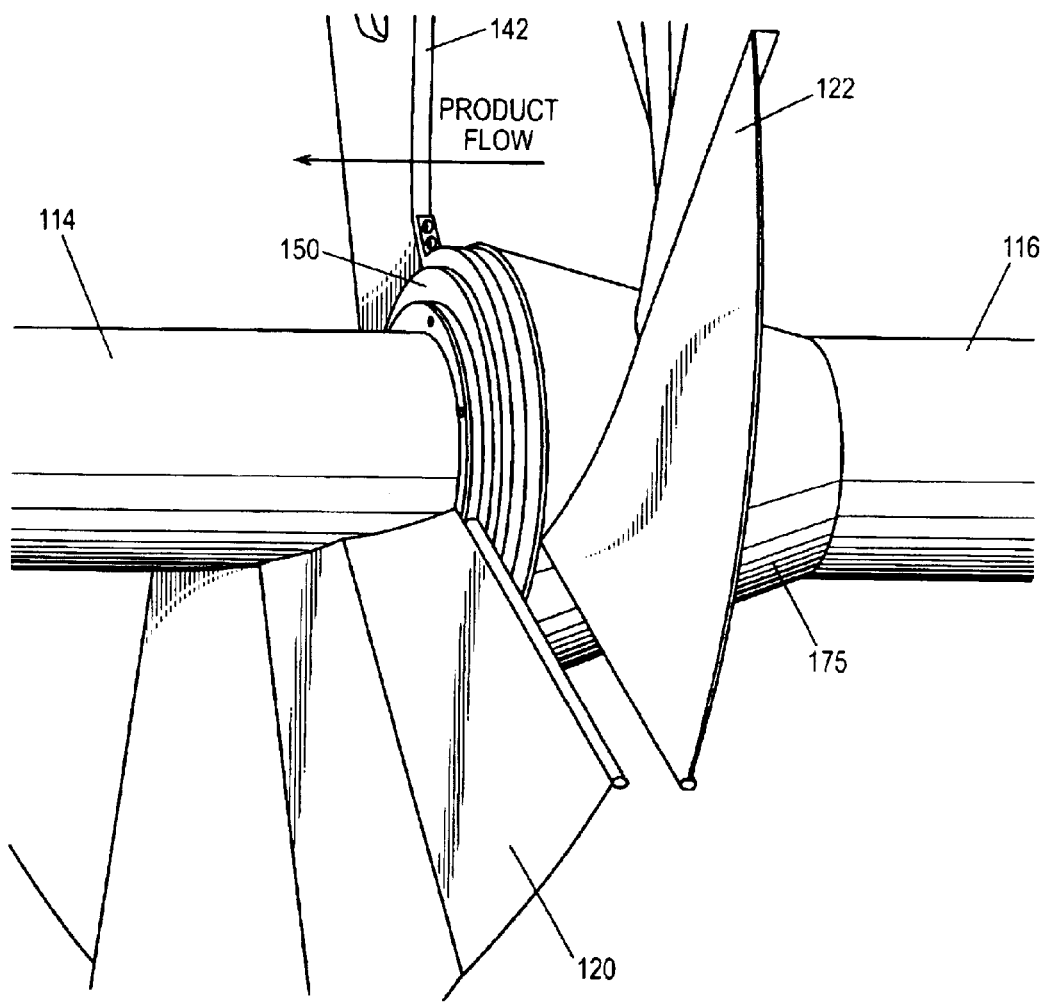
FIG. 8 is a perspective view of the bearing assembly and the conical bird deflector.

A preferred embodiment is shown in FIGS. 4B, 5B, and 6B and includes a bird deflector 175 for urging the birds radially about the auger bearing assembly 140. As shown best in FIG. 4B, the bird deflector can be conical, is mounted on the auger shaft 114 with its axis co-axial with the longitudinal axis of the auger shaft, with its smaller end portion facing the bird entrance end of the tank and the on-coming birds, and its larger end portion placed adjacent the auger shaft bearing. The larger end portion of the conical bird deflector is substantially the same diameter or breadth as the diameter or breadth of the auger shaft bearing assembly. The bird deflector rotates in unison with the auger shaft and urges any birds moving near the auger shaft about the auger shaft bearing, avoiding any interruption of movement of the birds by the bearing. While this embodiment of the bird deflector is conical, other shapes may be used as long as they function to guide or "deflect" birds about the shaft bearing as described hereinafter.

OPERATION

As previously noted, FIG. 4A is a cross section of a poultry chiller 100 as viewed from the inlet end. As shown, the poultry chiller 100 is referred to as a right hand chiller in that the majority of birds will travel the length of the chiller down the right hand side as viewed from the inlet end. For the auger 110 configuration shown, this is achieved by rotating the auger 110 in a counter clockwise direction, as indicated by the arrow in FIG. 4A. Preferably, the hanger bearing assembly 140 is therefore disposed on the left hand side of the poultry chiller 100 to avoid impeding movement of the birds within the poultry chiller 100.

Referring now to FIG. 6A, a cross-sectional view of a poultry chiller 100, as viewed from the outlet end, is shown. In contrast to the poultry chiller 100 shown in FIG. 4A, the poultry chiller shown in FIG. 6A is a left handed poultry chiller, meaning the majority of birds will travel the length of the poultry chiller 100 on the left hand side, as indicated by the arrow in FIG. 6B. This is achieved by imparting a clockwise rotation on the auger 110, the direction of rotation being determined as viewed from the inlet end. As FIG. 6A depicts a view of the poultry chiller 100 from the outlet end, the arrow appears to indicate a counter clockwise rotation. Dashed line 170 indicates a typical water level maintained within the poultry chiller 100 during operation. During operation, the surfaces of the first flight segment 120 and second flight segment 122 disposed toward the outlet end of the poultry chiller 100 make contact with the birds, thereby urging the birds toward the outlet end of the poultry chiller 100. As shown in FIG. 6A, ideally the birds 172 remain below the surface of the water 170 during their entire transit of the poultry chiller 100. However, it is possible that a bird 174 may be raised out of the water 170 due to frictional forces between the bird 174 and the surface of the auger 110. In such cases, it is desirable that the bird 174 drop back below the surface of the water 170 without damage. Therefore, to prevent potentially shearing the bird between the leading edge 125 of the second flight segment 122 and the front edge 143 of the lower bearing plate 142, the front edge 143 is both disposed to the non-poultry side of the chiller, or right hand side in the case of a left hand chiller, and angled so as not to form a scissor-like cutting surface with the leading edge 125 of the second flight segment 122.

As shown in FIG. 6B, preferred embodiments of the present hanger bearing assembly 140 reduce the distance 127 between the trailing edge 123 of the first flight segment 120 and the leading edge 125 of the second flight segment 122. The reduced distance 127 between adjacent flight segments 120, 122 associated with preferred embodiments of the present hanger bearing assembly 140 ensure that the birds traveling through the poultry chiller 100, whether above or below the water surface 170, will not be able to travel counter to their intended direction through the chiller 100. Therefore, preferred embodiments of the hanger bearing assembly 140 prevent both surging of the birds as well as lost product due to birds remaining in the poultry chiller 100 after operations have ceased.

The bird deflector 175 assists the smooth transition of the birds across the auger shaft bearing assembly 140, so that the hazard of the movement of the birds travelling adjacent the auger shaft being interrupted by the bearing is reduced. The cone-shaped bird deflector is built on the upstream side of the auger shaft bearing and causes the birds to be moved outwardly from the hanger bearing mounting plates, thereby eliminating the likelihood of the birds riding the side of the auger shaft and running into the hanger bearing plate and being picked up by the end of the auger flight and flipped over the auger shaft instead of passing through the bearing area normally. The bird deflector cone is integral to the auger. The auger flight extends through the cone area and expands outwardly to substantially the same breadth as the breadth of the auger shaft bearing to guide the birds about the hanger bearing without interruption in the movement of the birds.

It should be emphasized that the above-described embodiments of the present hanger bearing assembly 140, particularly, any "preferred" embodiments, are merely possible examples of implementations, merely set forth for a clear understanding of the principles of the hanger bearing assembly 140. Many variations and modifications may be made to the above-described embodiments of the hanger bearing assembly 140 without departing substantially from the spirit and principles of the hanger bearing assembly 140. All such modifications and variations are intended to be included herein within the scope of this disclosure of the hanger bearing assembly 140 and protected by the following claims.

What is claimed is:

1. A hanger bearing assembly for use in an auger type poultry chiller, the poultry chiller having an auger with a first flight and a second flight secured to an auger shaft, the first flight having a first flange plate and the second flight having a second flange pate, said hanger bearing comprising:
   a bearing disk secured between the first flange plate and the second flange plate;
   a bearing block disposed about said bearing disk;
   a lower bearing plate secured to the poultry chiller, the lower bearing plate having a support segment configured to receive said bearing block;
   an upper bearing plate configured to receive said bearing block;
   wherein said upper bearing plate is secured to said lower bearing plate, thereby maintaining said bearing block adjacent said bearing disk and securing the auger to said lower bearing plate, and
   a conical deflector mounted on said auger shaft adjacent said hangar bearing for urging the birds radially about said hangar bearing.

2. The hanger bearing assembly of claim 1, further comprising:
   a coupling aperture disposed in said bearing disk along a central longitudinal axis of said bearing disk;
   a first coupling recess disposed in said first flange plate;
   a second coupling recess disposed in said second flange plate;
   a coupling shaft; and
   wherein said coupling shaft is disposed in said first coupling recess, said second coupling recess and said coupling aperture, thereby axially aligning the first flight and the second flight.

3. The hanger bearing assembly of claim 1, wherein said bearing block further comprises an O-shaped bearing including a U-shaped channel disposed along an outer circumference.

4. The hanger bearing assembly of claim 1, wherein said bearing disk is comprised of stainless steel.

5. The hanger bearing assembly of claim 1, wherein said bearing disk is approximately 2 inches in width and said lower bearing plate is approximately 1 inch in width.

6. The hanger bearing assembly of claim 1, wherein said bearing disk is secured adjacent said first flange plate and said second flange plate with a plurality of threaded fasteners.

7. The hanger bearing assembly of claim 1, wherein said upper bearing plate and said lower bearing plate are connected by a plurality of threaded fasteners.

8. The hanger bearing assembly of claim 1, wherein said lower bearing plate extends radially outwardly beyond a periphery of the auger and is secured to a support member connected to the poultry chiller, said support member being disposed outside of said periphery.

9. The hanger bearing assembly of claim 1, wherein a bottom segment of said lower bearing plate extends beyond a vertical centerline of said bearing disk such that said lower bearing plate supports the auger.

10. The hanger bearing assembly of claim 1, further comprising:
    a coupling shaft having a first end and a second end, the coupling shaft being integral to said bearing disk;
    a first coupling recess disposed in the first flange plate, the first coupling recess being configured to receive the first end;
    a second coupling recess disposed in the second flange plate, the second coupling recess being configured to receive the second end; and
    wherein said first end is disposed in said first coupling recess and said second end is disposed in said second coupling recess, thereby axially aligning the first and the second flights.

11. The hanger bearing assembly of claim 1, wherein said bearing block further includes a first half and a second half, said support segment further includes a first bearing support surface configured to receive said first half, and said upper bearing plate further includes a second bearing support surface configured to receive said second half.

12. The hanger bearing assembly of claim 1, wherein a first diameter of said bearing disk is greater than a second diameter of the auger shaft.

13. A hanger bearing assembly for use in an auger type poultry chiller, the poultry chiller having a support member attached thereto, an auger with a first flight secured to a first auger shaft segment and a second flight secured to a second auger shaft segment, said hanger bearing comprising:
    a bearing disk secured between said first auger shaft segment and said second auger shaft segment, a bearing block disposed about said bearing disk, a lower bearing plate secured to said support member, said lower bearing plate being configured to receive said bearing block, an upper bearing plate configured to receive said bearing block wherein said upper bearing plate is secured to said lower bearing plate, thereby maintaining said bearing block adjacent said bearing disk and securing said auger to said lower bearing plate, and deflector means mounted on said first auger shaft for urging the birds radially away from said hanger bearing.

14. The hanger bearing assembly of claim 13, wherein said lower bearing plate extends radially outwardly beyond said first flight and said second flight and is secured to said support member.

15. The hanger bearing assembly of claim 14, wherein said bearing block further comprises an O-shaped bearing including a U-shaped channel disposed along an outer circumference.

16. The hanger bearing assembly of claim 14, wherein said bearing disk is secured between the first and the second auger shaft segments with a plurality of threaded fasteners.

17. The hanger bearing assembly of claim 14, wherein said lower bearing plate further includes a support segment, said support segment extending beyond a vertical centerline of said bearing disk such that said lower bearing plate supports the auger independently of said upper bearing plate.

18. The hanger bearing assembly of claim 14, wherein said bearing block further includes a first half and a second half, said support segment further includes a first bearing support surface configured to receive said first half, and said upper bearing plate further includes a second bearing support surface configured to receive said second half.

19. A poultry chiller for reducing the temperature of previously eviscerated whole birds and the like, comprising:

a tank having a first end, a second end, and a water reservoir therebetween;

an auger extending substantially from said first end to said second end, said auger including a first flight secured to a first auger shaft segment and a second flight secured to a second auger shaft segment;

power means in driving relationship with said auger; a support member connected to said tank;

a hanger bearing assembly including a bearing disk secured between said first auger shaft segment and said second auger shaft segment, a bearing block disposed about said bearing disk, a lower bearing plate secured to said support member, said lower bearing plate being configured to receive said bearing block, an upper bearing plate configured to receive said bearing block; and wherein said upper bearing plate is secured to said lower bearing plate, thereby maintaining said bearing block adjacent said bearing disk and securing said auger to said lower bearing plate; and a bird deflector mounted on said auger adjacent said hanger bearing for urging the birds radially about said hanger bearing.

20. The poultry chiller of claim 19, wherein said lower bearing plate extends radially outwardly beyond said first flight and said second flight and is secured to said support member.

21. The poultry chiller of claim 19, wherein a first diameter of said bearing disk is greater than a second diameter of said auger shaft.

22. A poultry chiller for reducing the temperature of previously eviscerated whole birds, comprising:

an elongated tank for holding chilled liquid and having an entrance for receiving the birds and an exit for delivering said birds, an auger extending along the length of said tank, said auger including a rotary shaft and at least two auger blades mounted about and longitudinally spaced from each other along said rotary shaft for moving the birds from the entrance of said tank to the exit of said tank, a bearing assembly positioned between said auger blades, said bearing assembly including a shaft bearing rotatably supporting said rotary shaft and a hangar mounted on said tank and supporting said shaft bearing, a conical bird deflector co-axially mounted on said rotary shaft at said bearing assembly and having a smaller end portion facing said entrance of said tank and a larger end portion facing said shaft bearing, whereby the conical bird deflector urges the birds away from the shaft bearing as the birds move about the shaft bearing.

23. The poultry chiller of claim 22, wherein:

said larger end portion of said conical bird deflector is substantially the same radial breadth as the radial breadth of said shaft bearing.

24. The poultry chiller of claim 23, wherein:

said hangar is displaced from directly above said shaft bearing.

* * * * *